(12) United States Patent
Takeuchi

(10) Patent No.: US 12,534,098 B2
(45) Date of Patent: *Jan. 27, 2026

(54) CONTROL APPARATUS, CONTROL METHOD, AND STORAGE MEDIUM

(71) Applicant: HONDA MOTOR CO., LTD., Tokyo (JP)

(72) Inventor: Yuji Takeuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 18/239,945

(22) Filed: Aug. 30, 2023

(65) Prior Publication Data

US 2024/0101134 A1 Mar. 28, 2024

(30) Foreign Application Priority Data

Sep. 28, 2022 (JP) ................. 2022-155265

(51) Int. Cl.
*B60W 50/14* (2020.01)
*G08C 17/02* (2006.01)

(52) U.S. Cl.
CPC ......... *B60W 50/14* (2013.01); *B60W 2530/00* (2013.01); *G08C 17/02* (2013.01)

(58) Field of Classification Search
CPC ....... B60W 30/06; B60W 50/14; B60L 53/36; B62D 15/0285; H04M 1/72415
See application file for complete search history.

(56) References Cited

U.S. PATENT DOCUMENTS

| 7,162,347 | B2 | 1/2007 | Shibamori et al. |
| 7,729,815 | B2 | 6/2010 | Watanabe et al. |
| 10,571,144 | B2 | 2/2020 | Kanada |
| 11,396,310 | B2 | 7/2022 | Ito et al. |

(Continued)

FOREIGN PATENT DOCUMENTS

| JP | 2003-067871 A | 3/2003 |
| JP | 2003-206554 A | 7/2003 |

(Continued)

OTHER PUBLICATIONS

Office Action dataed Mar. 18, 2024, issued in counterpart JP Application No. 2022-155266, with English translation. (6 pages).

(Continued)

*Primary Examiner* — Abby Lin
*Assistant Examiner* — Renee LaRose
(74) *Attorney, Agent, or Firm* — WHDA, LLP

(57) ABSTRACT

There is provided with a control apparatus. A first obtaining unit obtains position information of a vehicle. A first setting unit sets a remote operation permitted range of the vehicle on a basis of movement information of the vehicle in a first predetermined period based on the position information. A determination unit determines whether or not to restrict a remote operation input to the vehicle from an associated user terminal that is a user terminal associated with the vehicle on a basis of a stop position of the vehicle based on the position information and the remote operation permitted range. The movement information includes the position information of the vehicle and a visit situation to the position in the first predetermined period.

20 Claims, 9 Drawing Sheets

(56) References Cited

U.S. PATENT DOCUMENTS

| | | |
|---|---|---|
| 11,801,872 B2 | 10/2023 | Moriya et al. |
| 2004/0236489 A1 | 11/2004 | Shibamori et al. |
| 2019/0118768 A1 | 4/2019 | Jeong |

FOREIGN PATENT DOCUMENTS

| | | |
|---|---|---|
| JP | 2004-312376 A | 11/2004 |
| JP | 2006-306191 A | 11/2006 |
| JP | 2009-059282 A | 3/2009 |
| JP | 4403985 B2 | 1/2010 |
| JP | 2010-256272 A | 11/2010 |
| JP | 2021-018714 A | 2/2021 |
| JP | 2021-174193 A | 11/2021 |
| KR | 20200052202 A | 5/2020 |
| WO | 2016157283 A1 | 10/2016 |

OTHER PUBLICATIONS

Office Action dated Aug. 25, 2025, issued in counterpart JP Application No. 2022-155265, with English translation. (7 pages).

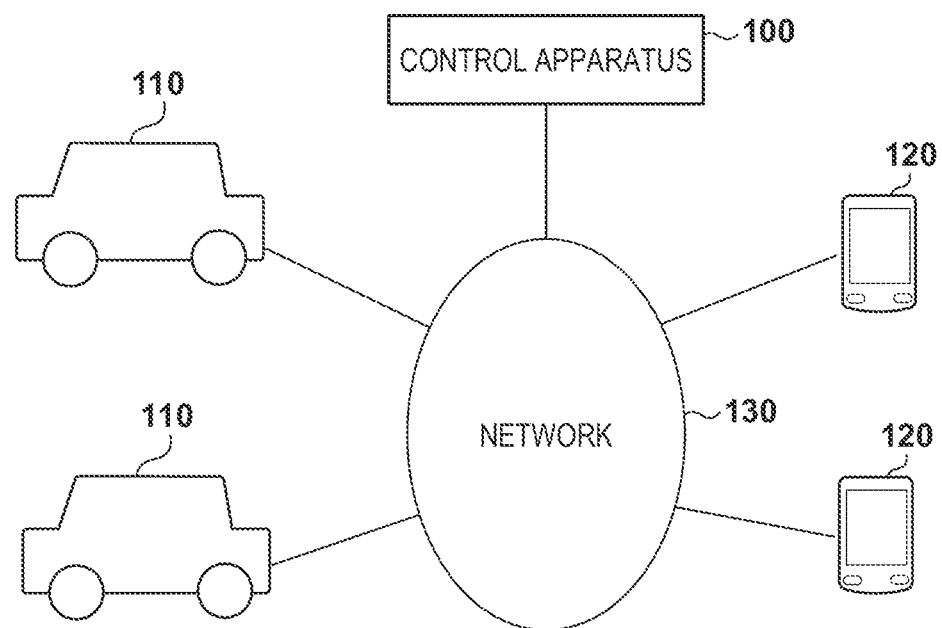
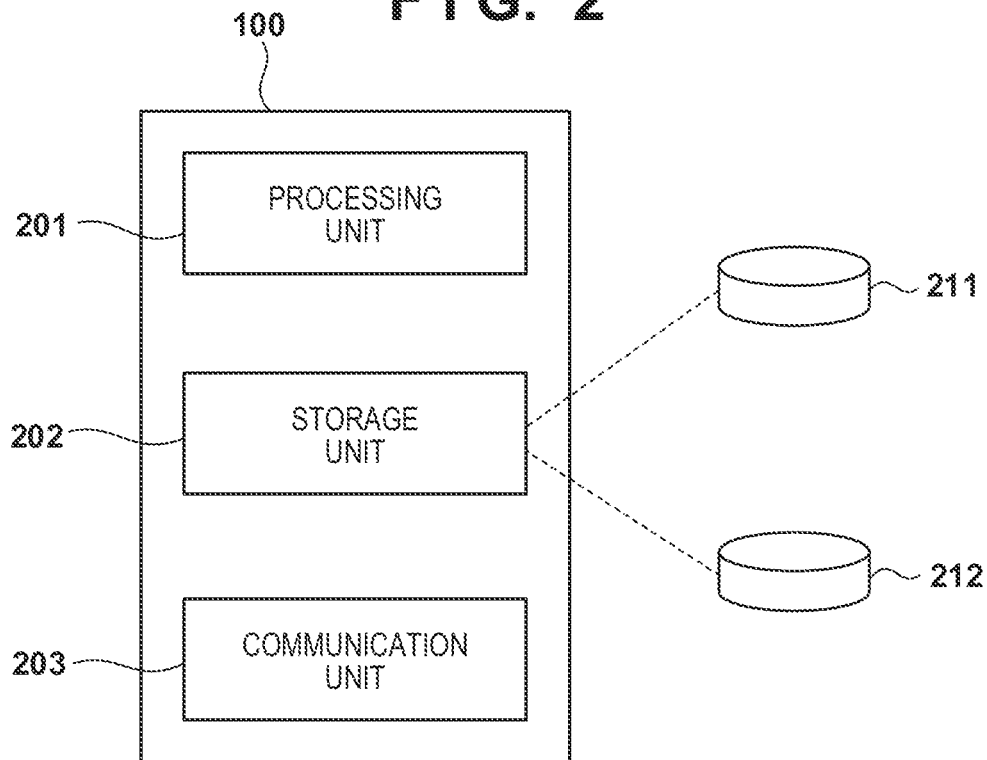

| USER ID | VEHICLE ID | STOP PERMISSION RANGE | RESTRICTED STATE | EXPIRATION DATE | ... |
|---|---|---|---|---|---|
| A0001 | C0001 | XX.XX,YY.YY | True | 2022/11/03 | ... |
| A0002 | C0002 | XX.XX,YY.YY | False | 2022/09/21 | ... |
| A0003 | C0001 | XX.XX,YY.YY | True | 2022/10/10 | ... |
| A0004 | C0003 | XX.XX,YY.YY | False | 2022/11/09 | ... |
| A0005 | C0004 | XX.XX,YY.YY | True | 2022/11/06 | ... |
| A0006 | C0004 | XX.XX,YY.YY | False | 2022/10/12 | ... |
| A0007 | C0005 | XX.XX,YY.YY | True | 2022/10/21 | ... |
| A0008 | C0006 | XX.XX,YY.YY | False | 2022/09/25 | ... |

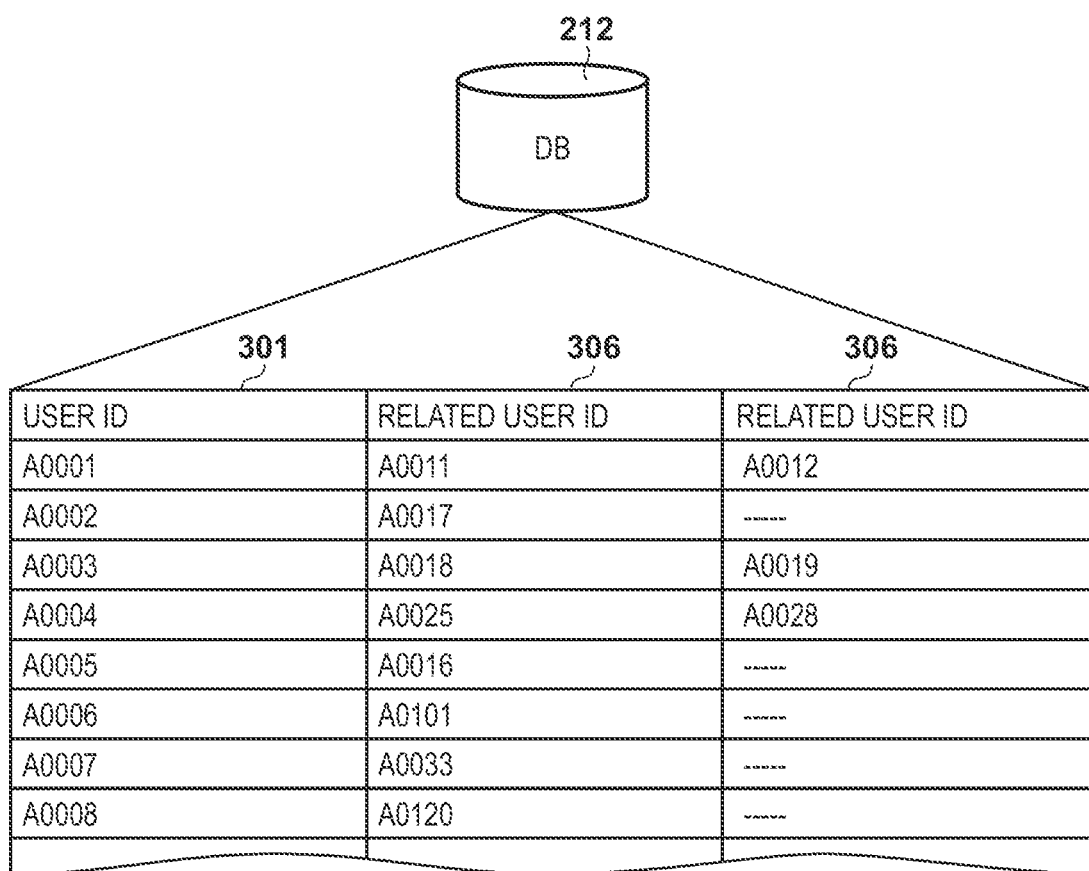

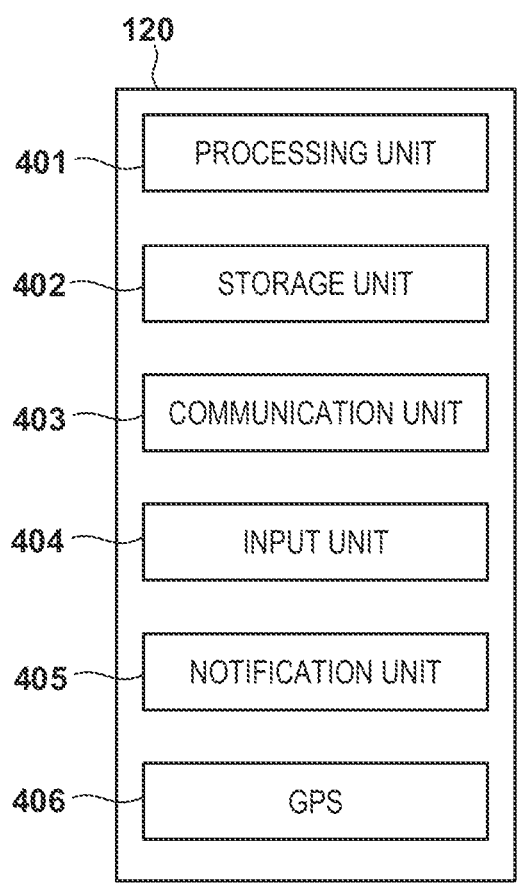
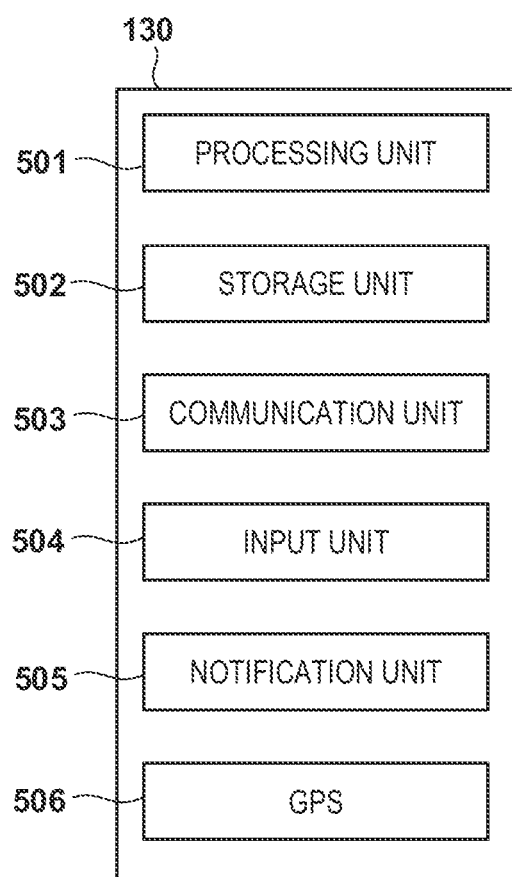

CONTROL APPARATUS, CONTROL METHOD, AND STORAGE MEDIUM

CROSS-REFERENCE TO RELATED APPLICATION(S)

This application claims priority to and the benefit of Japanese Patent Application No. 2022-155265 filed on Sep. 28, 2022, the entire disclosure of which is incorporated herein by reference.

BACKGROUND OF THE INVENTION

Field of the Invention

The present invention relates to a control apparatus, a control method, and a storage medium

Description of the Related Art

Conventionally, a device and a system that cause a vehicle to execute a requested operation in response to a remote operation request of a vehicle user are known. Japanese Patent No. 4403985 discloses a technique for determining whether or not to permit a remote operation based on a parking position so that an inappropriate remote operation is not executed in light of a current situation of a vehicle.

SUMMARY OF THE INVENTION

According to one embodiment of the present disclosure, a control apparatus comprises: a first obtaining unit configured to obtain position information of a vehicle; a first setting unit configured to set a remote operation permitted range of the vehicle on a basis of movement information of the vehicle in a first predetermined period based on the position information; and a determination unit configured to determine whether or not to restrict a remote operation input to the vehicle from an associated user terminal that is a user terminal associated with the vehicle on a basis of a stop position of the vehicle based on the position information and the remote operation permitted range, wherein the movement information includes the position information of the vehicle and a visit situation to the position in the first predetermined period.

According to another embodiment of the present disclosure, a control method comprises: obtaining position information of a vehicle; setting a remote operation permitted range of the vehicle on a basis of movement information of the vehicle in a first predetermined period based on the position information; and determining whether or not to restrict a remote operation input to the vehicle from an associated user terminal that is a user terminal associated with the vehicle on a basis of a stop position of the vehicle based on the position information and the remote operation permitted range, wherein the movement information includes the position information of the vehicle and a visit situation to the position in the first predetermined period.

According to yet another embodiment of the present disclosure, a non-transitory computer-readable storage medium stores a program which, when executed by a computer comprising a processor and a memory, causes the computer to: obtain position information of a vehicle; set a remote operation permitted range of the vehicle on a basis of movement information of the vehicle in a first predetermined period based on the position information; and determine whether or not to restrict a remote operation input to the vehicle from an associated user terminal that is a user terminal associated with the vehicle on a basis of a stop position of the vehicle based on the position information and the remote operation permitted range, wherein the movement information includes the position information of the vehicle and a visit situation to the position in the first predetermined period.

BRIEF DESCRIPTION OF THE DRAWINGS

FIG. 1 is a diagram illustrating an example of a system configuration for providing a remote operation service of the present invention;

FIG. 2 is a diagram illustrating an example of a configuration of a control apparatus;

FIG. 3B is a diagram illustrating an example of data stored in the database;

FIG. 4 is a diagram illustrating an example of a hardware configuration of an in-vehicle device of a vehicle;

FIG. 5 is a diagram illustrating an example of a hardware configuration of a user terminal;

DESCRIPTION OF THE EMBODIMENTS

Figure 3A:
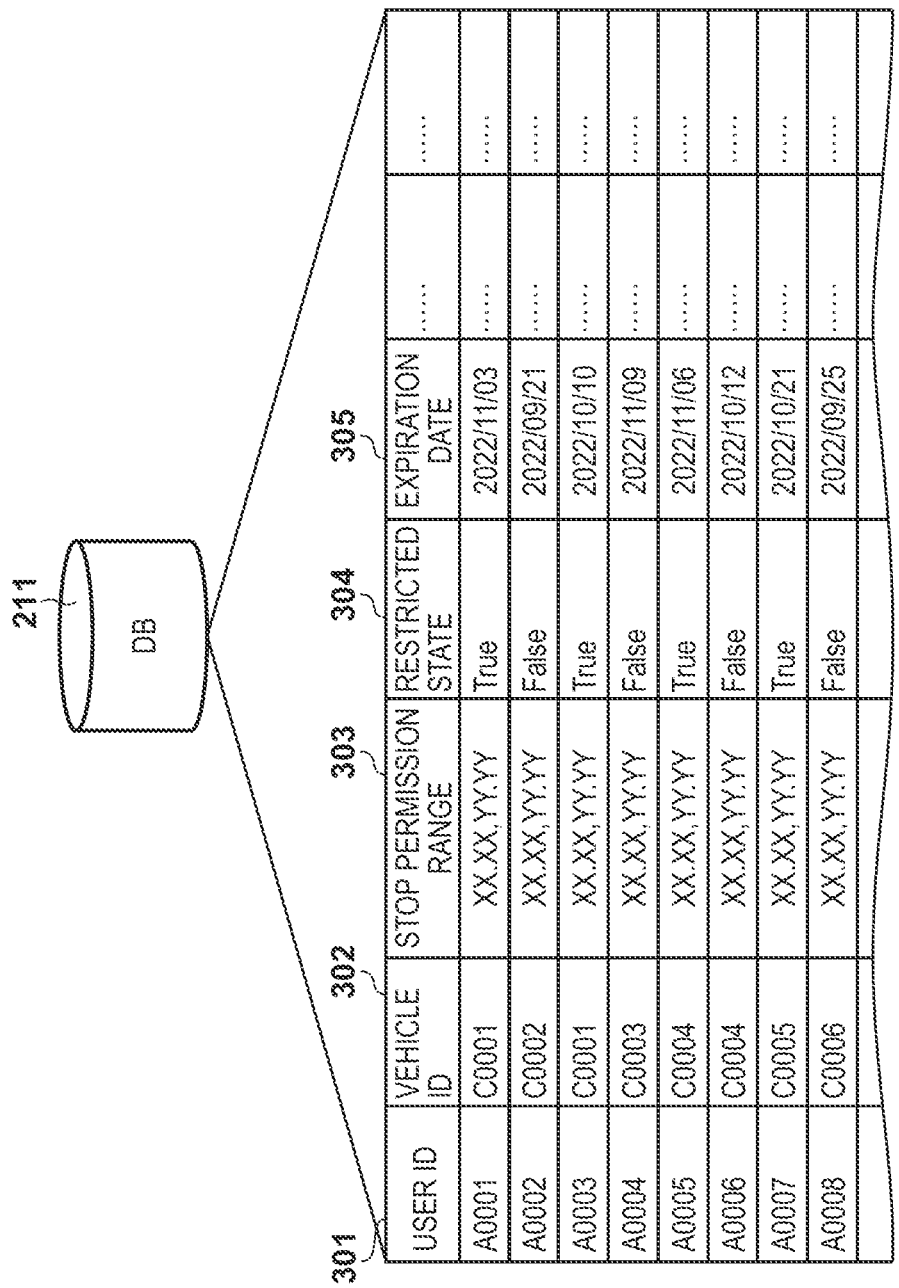
FIG. 3A is a diagram illustrating an example of data stored in a database.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

The technique described in Japanese Patent No. 4403985 has a problem that, in a case where the ownership of a vehicle is transferred to another person by a malicious user, for example, reselling of the vehicle, the authority of remote control remains in the original user.

Therefore, an embodiment of the present invention makes it possible to properly limit the authority of the remote operation of the vehicle. Further, the embodiment of the present invention also makes it possible to give particular consideration to the needs of vulnerable people, women, children, disabled people, and the elderly, and to provide all people with access to a sustainable transportation system that is safe, inexpensive, and easily available by improving traffic safety through expansion of public transportation, and the like.

A control apparatus according to the embodiment of the present invention obtains position information of a vehicle, and sets a remote operation permitted range of the vehicle on the basis of movement information of the vehicle in a first predetermined period based on the position information. Next, the control apparatus obtains information indicating that a specific operation for a remote operation input to the vehicle from a user terminal is performed, and restricts the remote operation input from the user terminal to the vehicle in a case where the position information of the vehicle at the time of obtaining the information is outside the remote operation permitted range. Here, the movement information includes the position information of the vehicle and a visit situation to the position in the first predetermined period. This control apparatus is particularly used for remote control of a vehicle. In the present embodiment, the description will be given assuming that the control apparatus is a server that communicates with the vehicle and the user terminal, but this is an example, and the configuration is not limited as long as similar control can be performed such as performing a part of the function by an in-vehicle device, for example.

System

FIG. 1 is a system diagram illustrating an example of a configuration of a remote operation service for remotely operating a vehicle 110 including a control apparatus 100 according to the present embodiment. The control apparatus 100 according to the present embodiment is a server as described above, and is communicably connected to the vehicle 110 and the user terminal 120 via the network 130. In the example of FIG. 1, one vehicle 110 and one user terminal 120 are illustrated, but the number of these is not particularly limited. Note that, hereinafter, the in-vehicle device of the vehicle is also referred to as a "vehicle".

In the remote operation service according to the present embodiment, the control apparatus 100 controls the vehicle 110 on the basis of a remote operation input in the user terminal 120. In the present embodiment, there is an associated user terminal associated with each of vehicles 110, and the vehicle 110 is controlled by the remote operation input to the associated user terminal.

Figure 7:
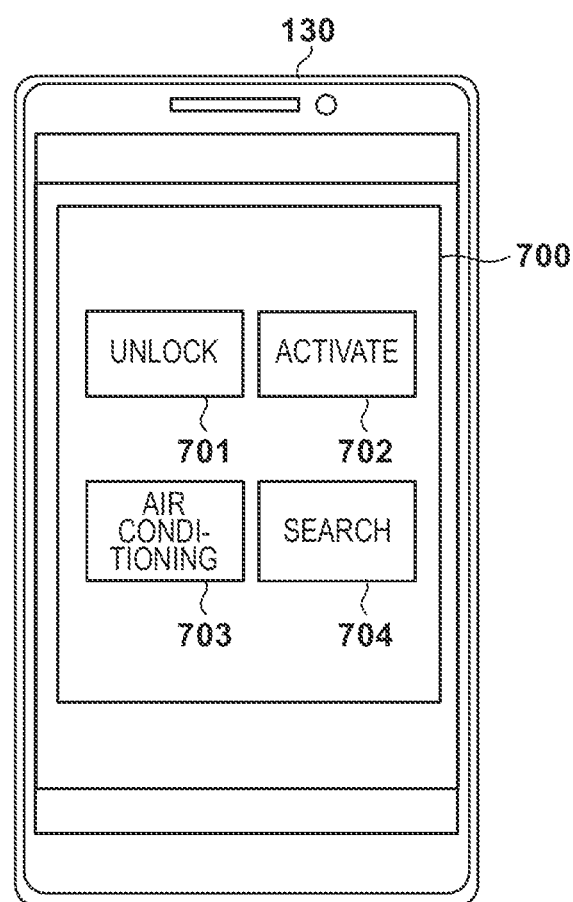
FIG. 7 is a diagram illustrating an example of a GUI in the user terminal when the remote operation service is executed.

As the remote operation input, for example, unlocking of the vehicle 110 or (power supply) activation of the vehicle is performed, but the remote operation input is not particularly limited thereto. For example, the user terminal 120 may receive, as the remote operation input, an operation of control of an in-vehicle device such as activation of an air conditioner or control for making it easier to find a vehicle (for example, turning on the light) by a GUI as illustrated in FIG. 7 to be described later, or may receive the remote operation input related to another function in the vehicle 110. In the present embodiment, it is assumed that the user terminal 120 receives the remote operation input by the user via a dedicated application for controlling the remote operation service, and the control apparatus 100 controls the vehicle 110 via the network 130. Hereinafter, when simply referred to as an "application", it is assumed to refer to the application that controls the remote operation service described above.

An operation example in the application according to the present embodiment will be described. The control apparatus 100 according to the present embodiment associates the vehicle 110 with the user terminal 120. Here, when the vehicle 110 is started, the identification information is displayed on a display unit inside the vehicle 110, and when the user terminal 120 receives the input of the identification information, the vehicle 110 and the user terminal 120 are associated with each other. As the identification information, for example, a personal identification number (PIN) code represented by a four-digit number is used. The vehicle 110 performs various operations such as door unlocking or power activation in response to the remote operation input via the application in the user terminal 120.

Note that, in the present embodiment, the control apparatus 100 controls the vehicle 110 on the basis of the remote operation input in the user terminal 120, but the user terminal 120 may directly communicate with the vehicle 110 to perform some or all of the control. The user terminal 120 is connected to the vehicle 110 by, for example, near field communication, and can control the vehicle 110. For example, when the user terminal 120 and the vehicle 110 are associated with each other by inputting identification information to the user terminal for the first time, the control apparatus 100 controls the vehicle 110. Next, for the remote operation such as unlocking of the vehicle 110 for a predetermined period (for example, 2 months) after the user terminal 120 and the vehicle 110 are associated with each other, communication of remote operation may be performed from the user terminal 120 to the vehicle 110 without going through the control apparatus 100. In this case, when the control apparatus 100 restricts the remote operation input from the user terminal 120 by processing to be described later, the control apparatus 100 restricts the communication of the remote operation by the near field communication from the user terminal 120 to the vehicle 110.

Although the vehicle 110 is described as a four-wheeled automobile in the present embodiment, for example, a vehicle of a different form such as a two-wheeled straddle type vehicle may be used as the vehicle 110. The user terminal 120 is, for example, a portable terminal such as a smartphone, and receives an input by the user including the remote operation input. The user terminal 120 according to the present embodiment can have a function as a digital key that unlocks the vehicle 110 by input via the application.

FIG. 2 is a block diagram illustrating an example of a hardware configuration of the control apparatus 100 according to the present embodiment. The control apparatus 100 includes a processing unit 201, a storage unit 202, and a communication unit 203. The processing unit 201 is a processor represented by a CPU, and executes a program stored in the storage unit 202. The storage unit 202 is a storage device such as a RAM, a ROM, or a hard disk. The communication unit 203 includes a wired or wireless communication interface capable of communicating with the vehicle 110 or the user terminal 120 via a communication network.

The storage unit 202 stores various data in addition to the program executed by the processing unit 201. The program may be installed in the control apparatus 100 from a storage medium such as a CD-ROM. In the example of FIG. 2, a database (DB) 211 to 212 is illustrated as data to be stored in the storage unit 202. Here, the DB 211 is a database that stores information in which the vehicle and the associated user terminal are associated with each other. The DB 212 is a database that stores information indicating a user terminal and a user terminal associated (for example, registered as a family) with the user terminal. Note that the DB 211 and the DB 212 may be separate databases, or may be collectively one database. In the present embodiment, for convenience, the databases are described separately, but it is not limited that each database exists as a separate database. FIGS. 3A and 3B are diagrams simply illustrating these DBs.

A record for each user terminal 120 is accumulated in the DB 211, and the user terminal, each vehicle associated with the user terminal, and information on how long the association is maintained (expiration date) are registered together. Furthermore, in the present embodiment, the DB 211 stores, for each user terminal, information indicating the remote operation permitted range set for the user terminal, and information (restriction information) as to whether or not the remote operation input is restricted by the control apparatus 100. As illustrated in FIG. 3A, the record stored in the DB 211 includes a user ID 301 corresponding to a user terminal, a vehicle ID 302 corresponding to a vehicle, a remote operation permitted range 303, a restricted state 304, and an expiration date 305. Here, the remote operation permitted range 303 is indicated by coordinates serving as a center for setting the remote operation permitted range. In addition, although the expiration date 305 is stored as a date when the association between the vehicle 110 and the user terminal 120 is resolved, the expiration date may be expressed in another mode such as storing information indicating a remaining period. In addition, in the present embodiment, the remote operation permitted range is registered in association with each user terminal 120 (as the remote operation permitted range in the vehicle associated with the user terminal), but the remote operation permitted range may be registered in association with the vehicle 110.

A record for each user terminal 120 is accumulated in the DB 212, and the user terminal and the user terminal associated with the user terminal are registered together. As illustrated in FIG. 3B, the record stored in DB 212 includes the user ID 301 corresponding to the user terminal and a related user ID 306 associated with the associated user terminal. Here, a plurality of user terminals may be registered in one user terminal, and the number thereof is not limited. In addition, in the example of FIG. 3B, management is performed by registering associated user terminals for each user terminal, but information regarding similar association may be stored in the DB 212 by registering a series of groups of associated user terminals.

Note that the control apparatus 100 allocates the user ID to the user terminal 120 on the basis of information obtained by communication from the user terminal 120, but for example, an ID generated using information input by the user via the application or the like may be allocated as the user ID.

FIG. 4 is a block diagram illustrating an example of a hardware configuration of the in-vehicle device of the vehicle 110 according to the present embodiment. The vehicle 110 includes a processing unit 401, a storage unit 402, a communication unit 403, an input unit 404, a notification unit 405, and a global positioning system (GPS) sensor 406. The processing unit 401 is a processor, a typical example of which is a CPU, and executes a program stored in the storage unit 402. The storage unit 402 is a storage device such as a RAM or a ROM. Programs stored in the storage unit 402 also include the application program for using the service of the present embodiment.

The communication unit 403 is a communication device for communicating with an external device. The communication unit 403 includes, for example, a wireless communication device capable of communicating with the control apparatus 100 via the communication network. Furthermore, for example, the communication unit 403 includes a wireless communication device capable of communicating with the user terminal 120 via near field communication. The input unit 404 is a device that receives a user's input. The notification unit 405 is a notification device inside the vehicle 110, and notifies the user of information by display on a display, or the like, for example. In the present embodiment, the input unit 404 and the notification unit 405 may constitute a touch panel display, and may be operable by touch input, for example, may be operable by a mechanical switch, a dial, or the like. The GPS sensor 406 is a sensor that obtains vehicle position information indicating the current position of the vehicle 110, and the vehicle position information is transmitted to the control apparatus 100 via the communication unit 403. As described above, the notification unit 405 according to the present embodiment can give a notification of identification information such as a PIN code when the vehicle 110 is activated. This notification may be displayed on a display or may be a notification by voice, and a method thereof is not particularly limited as long as the user can be notified. In the following description, it is assumed that the notification unit 405 performs notification by display on the display.

Here, the notification unit 405 notifies the identification information in a case where the vehicle 110 is in the unlocked state. Note that notification of the identification information may be performed when the vehicle 110 is activated. First, in a case where the vehicle 110 is unlocked without going through the user terminal 120 (for example, by a physical key) (before the user terminal 120 is registered to the vehicle 110), by notifying the user of the identification information by the notification device inside the vehicle 110, an appropriate (unlockable) user is notified of the identification information, and association between the vehicle 110 and the user terminal 120 can be appropriately performed as initial setting. In the present embodiment, when the input of the identification information displayed on the notification unit 405 in the user terminal is confirmed, the control apparatus 100 registers the user terminal as the associated user terminal associated with the vehicle 110 (for example, in the form illustrated in FIG. 3A). An example of display for inputting the identification information in the user terminal 120 will be described later with reference to FIG. 6A.

In addition, the communication unit 403 can detect the user terminal inside the vehicle 110 by near field communication. Here, the communication unit 403 may generate information (here, it is assumed to be indicated by a user ID) indicating the user terminal 120 present inside the vehicle 110 when the vehicle 110 is stopped and transmit the information to the control apparatus 100. In this case, the control apparatus 100 refers to the associated remote operation permitted range for each of the user terminals 120 present inside the vehicle 110 before at the time when the vehicle 110 is stopped, and can determine whether or not to restrict the remote operation input to the vehicle 110 on the basis of the referred remote operation permitted range and the stop position of the stopped vehicle 110 (determination on whether or not to restrict the remote operation input will be described later). By such processing, it is possible to determine whether or not to restrict the remote operation input using the remote operation permitted range associated with the user terminal of the last user in the vehicle 110. In addition, in a case where there is a plurality of user terminals 120 present inside the vehicle 110 before at the time when the vehicle 110 is stopped, it is decided that the stop position is outside the remote operation permitted range when the stop position of the vehicle is outside any of the remote operation permitted ranges associated with these user terminals 120.

FIG. 5 is a block diagram illustrating an example of a hardware configuration of the user terminal 120 according to the present embodiment. Since the user terminal 120 basically includes each functional unit capable of executing a function similar to that of the vehicle 110, redundant description will be omitted.

The description will be given on the assumption that the position information (vehicle position information) of the vehicle 110 and the position information (terminal position information) of the user terminal 120 according to the present embodiment are information indicating a position with respect to map information obtained by a GPS sensor, and are obtained and updated at predetermined intervals. However, the control apparatus 100 may obtain each piece of the position information by a different procedure such as transmitting the position information of the vehicle 110 or the user terminal 120 to the control apparatus 100 by a device in an external facility, for example.

Remote Operation Service

Hereinafter, details of processing performed by the control apparatus 100 in the remote operation service according to the present embodiment will be described. The following processing is performed by the processing unit 201 of the control apparatus 100.

The control apparatus 100 obtains the position information of the vehicle 110, and sets the remote operation permitted range of the vehicle 110 on the basis of movement information of the vehicle 110 in a first predetermined period based on the position information. The remote operation permitted range according to the present embodiment is a range set to restrict the remote operation input from the user terminal 120 in a case where, for example, the stop position of the vehicle is present outside the remote operation permitted range for a third predetermined period, and details thereof will be described later. The first predetermined period according to the present embodiment can be arbitrarily set, but is assumed to be, for example, a predetermined number of days (such as the last 30 days). Here, the predetermined number of days (including the second predetermined period and the third predetermined period to be described below) indicates to elapse passing a predetermined timing (for example, 0:00) in one day, that is, it is assumed to be calculated by the number of times of crossing a day, but one day may be calculated according to the elapse of 24 hours, and the number of days may be calculated by another calculation method as long as it is used as a guide for the elapse of the number of days.

The movement information of the vehicle 110 includes a visit situation to a certain position of the vehicle in a first predetermined period. Here, the visit situation includes the number of visits to a certain position of the vehicle 110 or a stop period. The control apparatus 100 according to the present embodiment may set, as the remote operation permitted range, for example, a range in which the stop period of the vehicle 110 is set on the basis of a position over the second predetermined period described below. Furthermore, for example, the control apparatus 100 may set, as the remote operation permitted range, a range set on the basis of a position where the number of visits (the number of stops) of the vehicle 110 is equal to or more than a predetermined number of times. Hereinafter, an example of a process of setting the remote operation permitted range by the control apparatus 100 will be described.

For example, the control apparatus 100 may set, as the remote operation permitted range, a range set on the basis of a position where the vehicle 110 is continuously stopped for the second predetermined period during the first predetermined period. In this case, the remote operation permitted range can be, for example, a predetermined range (for example, a radius of 100 meters) centered on a position where the vehicle is continuously stopped for the second predetermined period (in consideration of a shift in position information, a shift in stop position, and the like). The second predetermined period can be arbitrarily set as a predetermined number of days, for example, three days. Note that, here, the vehicle may stop at the same position in a case where the vehicle continues to be located at the same coordinates (a margin can be set) by the GPS sensor, or the vehicle may stop at the same position in a case where the vehicle continues to be located at the same facility (for example, a parking lot or the like) on the map.

Furthermore, for example, the control apparatus 100 may set, as the remote operation permitted range, a range set on the basis of a position where the number of times the vehicle stops in the first predetermined period is equal to or more than a predetermined number of times. In this case, the remote operation permitted range can be, for example, a predetermined range (for example, a radius of 100 meters) centered on a position where the number of times the activation of the vehicle is stopped in the first predetermined period is equal to or more than a predetermined number of times. Here, the predetermined number of times can be arbitrarily set according to a requirement required by the user of the control apparatus 100, for example, four times.

Furthermore, for example, the control apparatus 100 may obtain a region where the number of times of passage of the vehicle in the first predetermined period is equal to or more than a predetermined number of times, and set a predetermined range set on the basis of the region as the remote operation permitted range. In this case, for example, the control apparatus 100 may directly detect a region that has passed a predetermined number of times or more, or may detect a plurality of points that has passed a predetermined number of times or more and obtain a region that has passed a predetermined number of times or more on the basis of the plurality of points. Here, the remote operation permitted range may be, for example, a range obtained by adding a predetermined width (for example, 20 meters) around a region that has passed a predetermined number of times or more, or may be a region group of a predetermined range (for example, a radius of 100 meters) from each of points that has passed a predetermined number of times. The predetermined number of times here can also be arbitrarily set according to a requirement required by the user of the control apparatus 100, for example, four times.

Furthermore, for example, the control apparatus 100 may set, as the remote operation permitted range, a range set on the basis of a position where the number of times a specific operation for performing the remote operation input to the vehicle is performed in the user terminal 120 is equal to or more than a predetermined number of times in the first predetermined period. In this case, the remote operation permitted range can be, for example, a predetermined range (for example, a radius of 100 meters) centered on a position where the number of times the specific operation is performed in the first predetermined period is equal to or more than a predetermined number of times. The predetermined number of times here can also be arbitrarily set according to a requirement required by the user of the control apparatus 100, for example, four times. Note that the specific operation for performing the remote operation input to the vehicle is an operation for activating a user input including, for example, an operation of activating the application in the user terminal 120, an operation of logging in on the application, an operation of performing the remote operation input on the application, or the like.

By setting the remote operation permitted range by such processing, a region frequently used by the vehicle is provided as the remote operation permitted range, and when the vehicle is stopped outside the region for a long period of time, it is possible to restrict the remote operation input as there is a possibility of abuse.

An update process of the remote operation permitted range is performed when a predetermined condition is satisfied. For example, in a case where a position where the vehicle 110 is stopped for a period equal to or more than a period in which the vehicle is stopped at a position used for setting the remote operation permitted range in the immediately preceding update is detected in the first predetermined period, the control apparatus 100 may update a range set using the newly detected position as a new remote operation permitted range. For example, in a case where the control apparatus 100 sets a range set on the basis of a position where the vehicle is continuously stopped for the second predetermined period during the first predetermined period as the remote operation permitted range, when a position where the vehicle 110 is stopped for the second predetermined period or more is newly detected, the control apparatus can update and set a predetermined range centered on the position as the next remote operation permitted range. Further, for example, in a case where the control apparatus 100 sets, as the remote operation permitted range, a range set on the basis of a position where the number of stops of the vehicle in the first predetermined period is equal to or more than a predetermined number of times, in a case where a position where the vehicle 110 stops for a predetermined number of times or more in the first predetermined period is newly detected, the control apparatus can update and set a predetermined range centered on the position as the next remote operation permitted range.

In addition, the update process of the remote operation permitted range may be performed every day, for example, or the remote operation permitted range may be updated every predetermined period (for example, one month). According to such a process, it is possible to set the remote operation permitted range so as to restrict the remote operation input when it continues to stop at a position deviated from the position where the stop frequency of the vehicle 110 is high.

Note that, in a case where the remote operation permitted range is updated, the control apparatus 100 may restrict the remote operation input until a specific operation is performed in the user terminal 120 associated with the vehicle. Here, when the remote operation permitted range is updated, the login state of the application in the user terminal 120 may be released, and the remote operation input may not be performed as the logout state until the login input is performed as the specific operation.

The update process of the remote operation permitted range may be a process of setting only a newly set remote operation permitted range as the next remote operation permitted range. In addition, the update process of the remote operation permitted range may be a process of setting all the remote operation permitted ranges newly set in the first predetermined period immediately before the current time point as the remote operation permitted ranges.

In addition, in a case where the login state is released for all the user terminals 120 associated with the vehicle 110 at the time of performing the update process, and logging-in is performed by the same user terminal as the user terminal 120 that has logged in at the time of performing the immediately preceding update process, both the previous remote operation permitted range and the new remote operation permitted range may be set as the updated remote operation permitted range. Furthermore, in a case where login is performed by a user terminal different from the user terminal 120 that has logged in at the time of performing the immediately preceding update process after the login state is released, only a new remote operation permitted range may be set as the updated remote operation permitted range.

The control apparatus 100 determines whether or not to restrict the remote operation input from the user terminal 120 to the vehicle 110 on the basis of the stop position of the vehicle 110 based on the vehicle position information and the remote operation permitted range. The control apparatus 100 can determine to restrict the remote operation input, for example, when the stop position of the vehicle 110 is present outside the remote operation permitted range during the third predetermined period. The third predetermined period according to the present embodiment can be arbitrarily set, but is assumed to be, for example, a predetermined number of days (such as two days).

For example, the control apparatus 100 may restrict the remote operation input by invalidating the remote operation input from the user terminal 120. That is, in a case where the remote operation via the application is input in the user terminal 120, the control apparatus 100 may not transmit the content of the remote operation to the vehicle 110. Further, in a case where the remote operation input in the user terminal 120 is transmitted to the vehicle 110 by near field communication, the control apparatus 100 may prohibit the application of the user terminal 120 from transmitting the input to the vehicle 110, or may not execute the instruction even when the vehicle 110 receives the instruction.

Further, for example, the control apparatus 100 may restrict the remote operation input by stopping the remote operation input in the user terminal 120. That is, the control apparatus 100 may stop processing for performing remote operation input, such as login or activation of the application in the user terminal.

Note that, in the present embodiment, the position at the time of stopping (the power supply of) the vehicle 110 is used as the stop position of the vehicle 110. That is, the control apparatus 100 first decides whether the position at the time of stopping the power supply of the vehicle 110 is present outside the remote operation permitted range. Next, in a case where it is decided that the vehicle is present outside the remote operation permitted range, the control apparatus 100 monitors whether or not a third predetermined period elapses before the next activation of the vehicle 110, and determines to restrict the remote operation input in a case where the third predetermined period elapses. In this manner, by determining whether or not to restrict the remote operation input with reference to the position at the time of stop, it is possible to prevent the remote operation input from being unnecessarily restricted, for example, when the vehicle is transported due to a failure or the like of the vehicle that has stopped within the remote operation permitted range. In addition, by setting the position at the time of stop as the stop position and not monitoring the position of the stopped vehicle 110, the power consumption of the vehicle can also be suppressed. However, for example, the position of the vehicle 110 may be continuously obtained even after the start of the vehicle 110 is stopped, and similar processing may be performed with the thus-obtained position as the stop position.

Figure 6A:
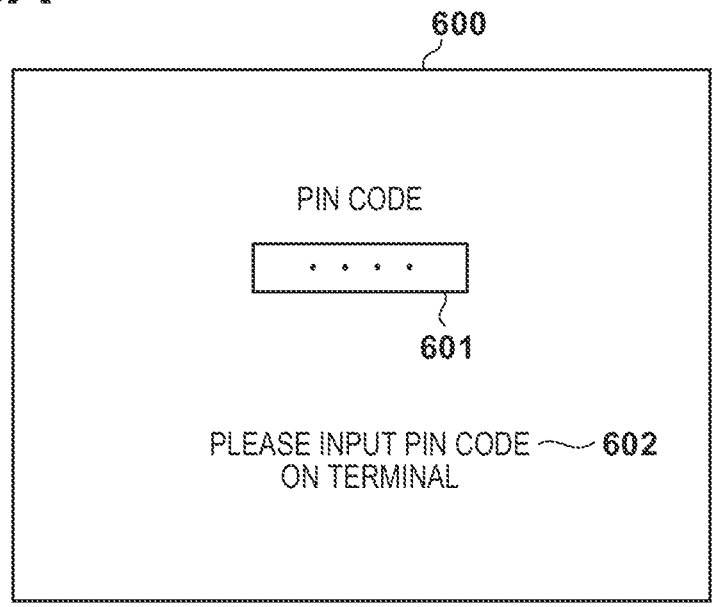
FIG. 6A is a diagram illustrating an example of a GUI for initial setting in the vehicle and the user terminal.
Figure 6B:
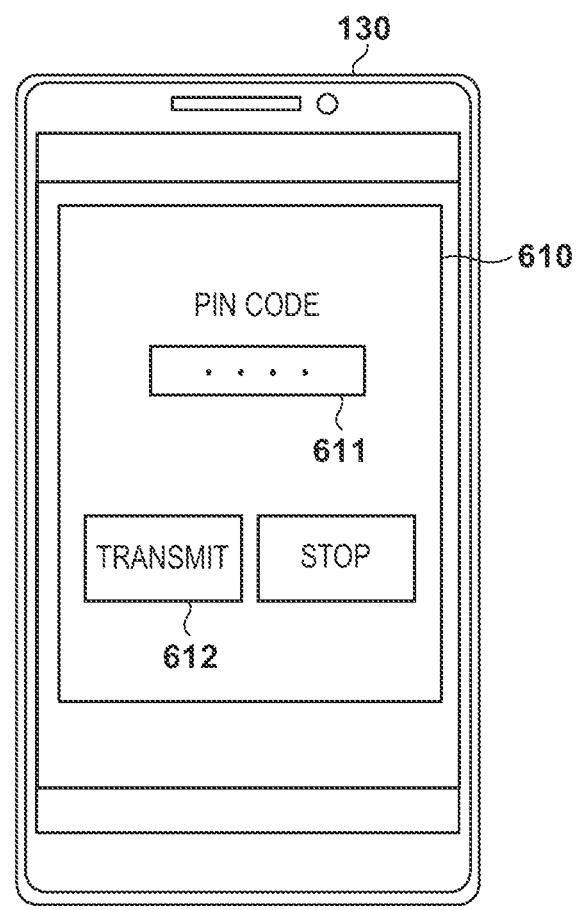
FIG. 6B is a diagram illustrating an example of the GUI for initial setting in the vehicle and the user terminal.

FIGS. 6A, 6B, and 7 are diagrams illustrating examples of GUIs displayed on the vehicle 110 and the user terminal 120 according to the present embodiment. FIGS. 6A and 6B display, as initial settings, examples of GUIs displayed for inputting identification information notified by the notification unit 405 of the vehicle 110 to the user terminal 120. FIG. 6A illustrates an example of a screen 610 for displaying a PIN code on a display that is the notification unit 405 of the vehicle 110, and FIG. 6B illustrates an example of a screen 600 for inputting a PIN code on the user terminal 120.

A screen 600 is a screen displayed when the vehicle 110 is unlocked, and a PIN code 601 and a message 602 are displayed. When the input of the PIN code by the user terminal 120 is confirmed, the notification of the identification information ends, and the display shifts to normal display. Here, since the notification unit 405 is a display of an in-vehicle device, it is assumed that when the screen 600 ends, the screen is switched to a general display screen such as a car navigation screen or a music playback management screen.

A screen 610 is an input screen of a PIN code displayed when the application is activated (Particularly, at the time of initial start-up), and an input frame 611 of the PIN code and a transmission button 612 of the PIN code are displayed. By completing the input of the PIN code, association between the vehicle 110 and the user terminal 120 is performed, and information as illustrated in FIG. 3A is recorded in the database.

FIG. 7 is a diagram illustrating an example of a GUI on the user terminal 120 for performing the remote operation input after the association between the vehicle 110 and the user terminal 120 is completed. In FIG. 7, buttons corresponding to the respective remote operations are displayed on a screen 700, and an instruction of the remote operation is transmitted to the vehicle 110 (via the control apparatus 100) by the user's input. The screen 700 displays an unlocking button 701 for unlocking the vehicle 110, an activation button 702 for activating the vehicle, an air conditioning button 703 for activating air conditioning (air conditioner), and a search button 704 for making it easier to find a vehicle.

When the unlocking button 701 is pressed by the user, the vehicle 110 is unlocked. In a case where the vehicle 110 is in the unlocked state, the unlocking button 701 may be changed to a lock button (not illustrated) for locking the vehicle 110. Further, when the activation button 702 is pressed by the user, the power of the vehicle shifts to an on state (for example, an ignition power-on state). By turning on the power source of the vehicle, the user can drive the vehicle 110.

When the air conditioning button 703 is pressed by the user, the air conditioner of the vehicle 110 is activated. In response to the pressing of the air conditioning button 703, the user terminal 120 may shift the screen 700 to a guide screen (not illustrated) that performs air conditioning control such as air conditioner temperature setting or air volume control. In addition, when the user presses the search button 704, control is performed to change the state of the vehicle 110 so that the user can easily search for the vehicle 110. Here, it is assumed that the light of the vehicle 110 blinks for a predetermined period (for example, 15 seconds) in response to the pressing of the search button 704, but the state of the vehicle 110 may be changed in another manner such as outputting a voice from a speaker of the vehicle 110.

Note that, from the viewpoint of improving security, when a predetermined button such as the activation button 702 is pressed, an authentication code may be displayed on the notification unit 405 of the vehicle, and an instruction corresponding to the pressed button may be transmitted to the vehicle 110 by inputting the authentication code to the user terminal.

In addition, the screen 700 may display other information of buttons for performing remote operations as described above. For example, the user terminal 120 may display information indicating remaining fuel and a cruising distance of the vehicle 110, may display information indicating whether or not the vehicle 110 is in an unlocked state, or may display a temperature (or outside temperature) inside the vehicle 110. Note that the user terminal 120 does not need to display all the remote control buttons illustrated in the screen 700, and may be able to perform remote control only for a function desired by the designer of the application. In addition, it is not necessary to display all the buttons on one screen as in the screen 700, and an object including each button may be arranged in a plurality of screens in a distributed manner.

Figure 10A:
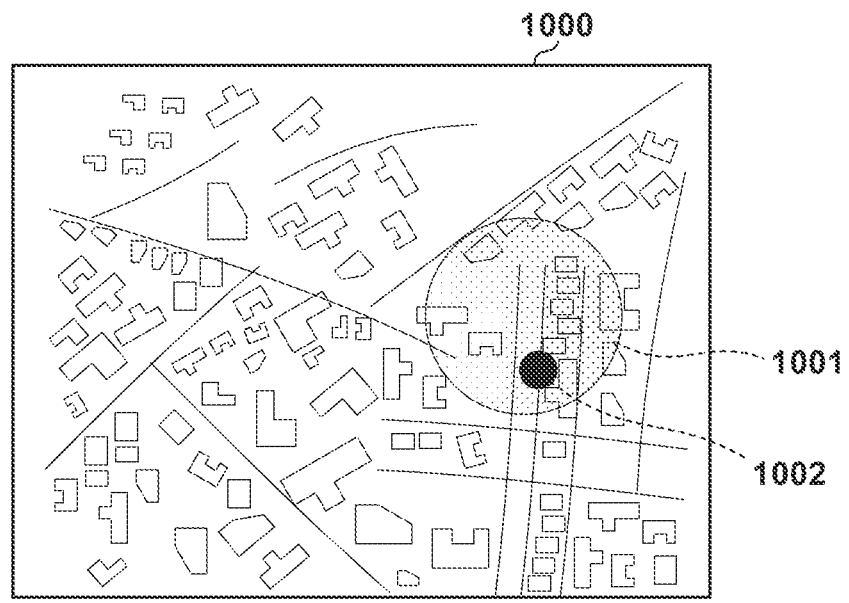
FIG. 10A is a diagram for describing a position state of the vehicle when restricting the remote operation input.
Figure 10B:
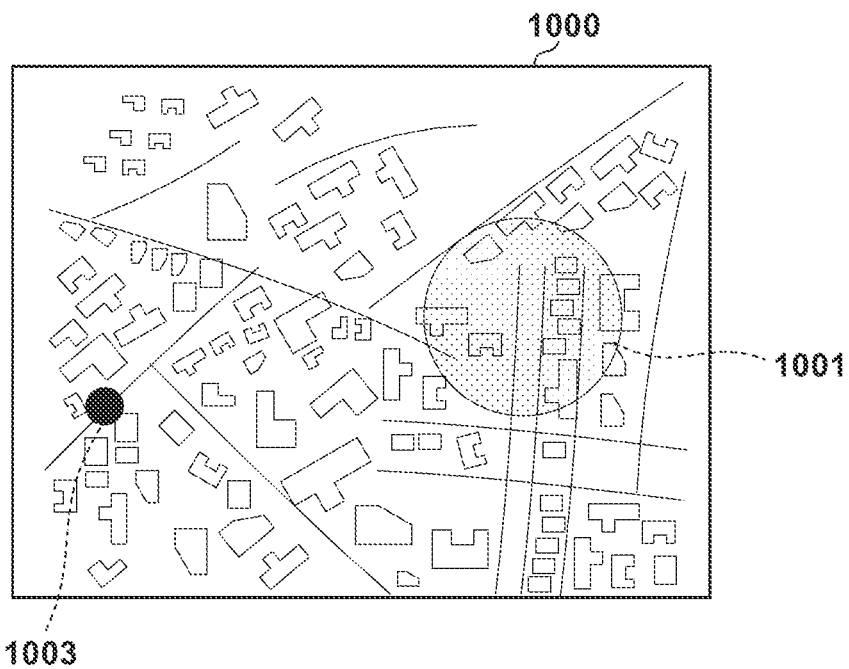
FIG. 10B is a diagram for describing a position state of the vehicle when restricting the remote operation input.

FIGS. 10A and 10B are diagrams for describing control processing according to the remote operation permitted range and the vehicle position by the remote operation service according to the present embodiment. In FIG. 10A and 10B, the control apparatus 100 sets a remote operation permitted range 1001 on a map 1000 on the basis of the movement information of the vehicle.

In FIG. 10A, a stop position 1002 based on the position information of the vehicle is detected, and the stop position 1002 is present within the remote operation permitted range 1001. Even when the vehicle is present at the stop position 1002 for the first predetermined period, the remote operation input is not restricted because the stop position is within the remote operation permitted range 1001.

On the other hand, in FIG. 10B, the stop position 1003 based on the position information of the vehicle is detected, and the stop position 1003 is out of the range of the remote operation permitted range 1001. In a case where the vehicle is present at the stop position 1003 for the first predetermined period, the control apparatus 100 according to the present embodiment restricts the remote operation input assuming that the vehicle may be used for abuse such as resale.

Figure 8:
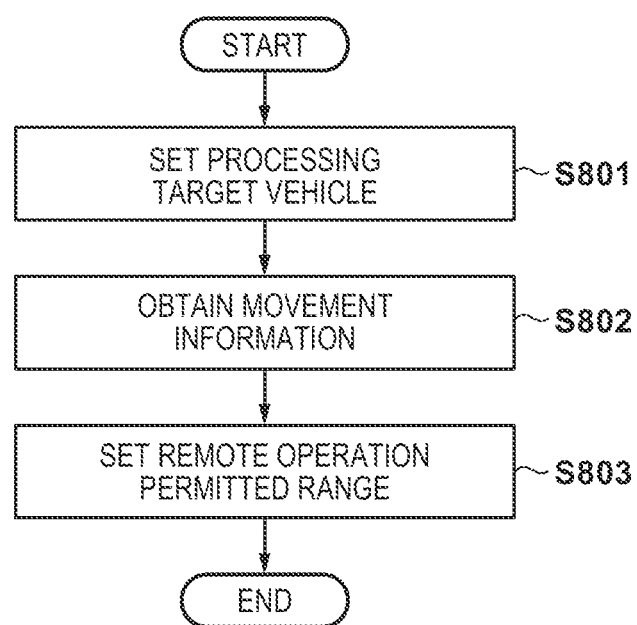
FIG. 8 is a flowchart illustrating an example of a remote operation permitted range setting process according to an embodiment.

Hereinafter, an example of processing in which the control apparatus 100 restricts the remote operation input to the user terminal as a processing target in the remote operation service according to the present embodiment will be described with reference to FIGS. 8 and 9. FIG. 8 is a flowchart illustrating an example of a process of setting the remote operation permitted range by the control apparatus 100. In S801, the control apparatus 100 sets the vehicle 110 as a processing target for setting the remote operation permitted range. Here, for example, the control apparatus 100 may set the vehicle 110 as a processing target by satisfying a predetermined condition for updating the remote operation permitted range, or may randomly set one of the vehicles registered in the DB 211 as a processing target, and a setting method of the processing target is not particularly limited.

In S802, the control apparatus 100 obtains movement information of the processing target vehicle 110 in the first predetermined period. Here, as the movement information, a movement history of the vehicle 110 in the first predetermined period may be stored in the DB 211, and information such as information indicating a position where the vehicle 110 has been continuously stopped for the second predetermined period may be stored in the DB 211. In S803, the control apparatus 100 sets (here, updates) the remote operation permitted range on the basis of the information obtained in S801, and terminates the processing. The update process described above is performed, and the description thereof is omitted here.

Figure 9:
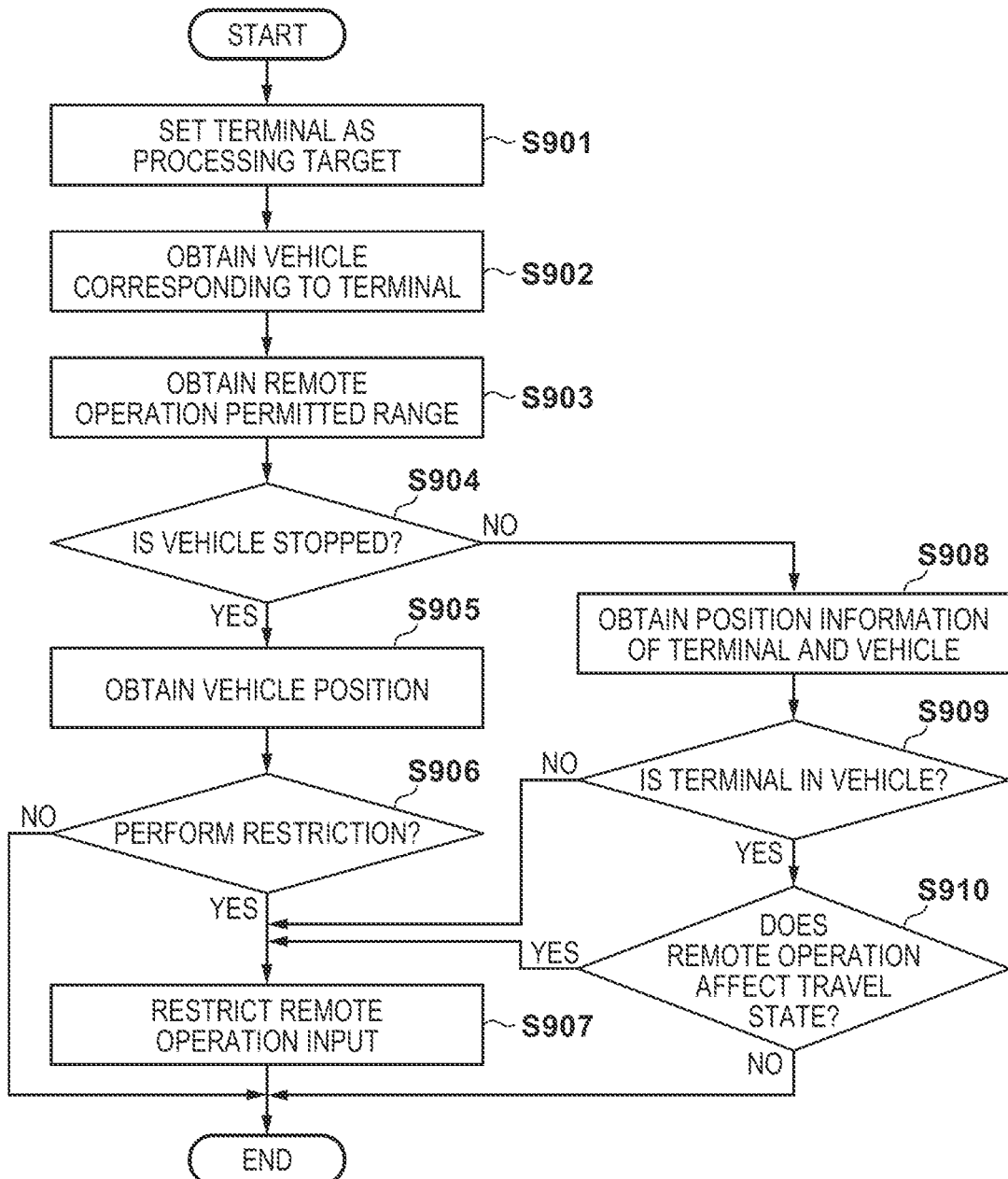
FIG. 9 is a flowchart illustrating an example of a restriction process of a remote operation input according to an embodiment.

FIG. 9 is a flowchart illustrating an example of a process of setting the remote operation permitted range according to the present embodiment, executed by the processing unit 401 of the control apparatus 100. In S901, the control apparatus 100 sets the user terminal 120 as the processing target for determining whether or not to restrict the remote operation input. Here, the control apparatus 100 sets the user terminal present inside the vehicle 110 before at the time when the vehicle 110 is stopped as described above as the processing target, but a method of setting the user terminal to be the processing target in S901 is not particularly limited. For example, the control apparatus 100 may set a user terminal on which a specific operation for performing a remote operation input to the vehicle, such as activation of the application, has been performed as the processing target, or may randomly set one of the user terminals registered in the DB 211 as the processing target.

In S902, the control apparatus 100 refers to the DB 211 and obtains information indicating the vehicle 110 associated with the user terminal 120 as the processing target. In S903, the control apparatus 100 obtains the remote operation permitted range for the vehicle 110 for which the information is obtained in S902. Here, since the remote operation permitted range is set in the processing illustrated in FIG. 8 and stored in the DB 211, the control apparatus 100 refers to the DB 211 to obtain the remote operation permitted range.

In S904, the control apparatus 100 decides whether or not the vehicle is stopped. Here, the control apparatus 100 can decide whether or not the vehicle is stopped by obtaining information of whether or not the power of the vehicle is on from the vehicle 110. When the vehicle is stopped, the process proceeds to S905, or otherwise the process ends.

In S905, the control apparatus 100 obtains the current stop position of the vehicle 110 and the stop period (stop period). Here, it is assumed that the control apparatus 100 sets the position of the vehicle 110 at the time of stopping the power supply last time as the current stop position, and obtains the time from the time of stopping the power supply to the present as the stop period. It is assumed that the time of stopping the power supply last time and the stop position are transmitted from the vehicle 110 to the control apparatus 100 and recorded in association with the vehicle in the DB 211, for example.

In S906, the control apparatus 100 determines whether or not to restrict the remote operation input from the user terminal 120 on the basis of the remote operation permitted range set in S903 and the current stop position and stop period of the vehicle 110 obtained in S905. Here, the control apparatus 100 first decides whether the current stop position of the vehicle is outside the remote operation permitted range, determines to restrict the remote operation input when the current stop position is outside the permitted range and the stop period exceeds the third predetermined period, or otherwise determines not to restrict the remote operation input. When the remote operation input is not restricted, the process ends, and when the remote operation input is restricted, the process proceeds to S907.

In S907, the control apparatus 100 restricts the remote operation input for the user terminal 120 as the processing target. Here, the control apparatus 100 restricts the remote operation input by disabling the remote operation input from the user terminal 120 or stopping the input of the remote operation in the user terminal. In the present embodiment, the remote operation input may be restricted only for the user terminal 120 as the processing target, or the remote operation input may be restricted for all the user terminals associated with the vehicle 110 corresponding to the user terminal 120 as the processing target. When S907 ends, the process ends.

With such a configuration, it is possible to set the remote operation permitted range on the basis of the position information of the vehicle 110 and determine whether or not to restrict the remote operation input from the user terminal 120 on the basis of the stop position of the vehicle 110 and the remote operation permitted range. In particular, in a case where the stop position is present outside the remote operation permitted range for a predetermined period, the remote operation input from the user terminal 120 to the vehicle 110 can be restricted. Therefore, even when resale of the vehicle 110 is performed by a malicious user, for example, it is possible to prevent the right of remote control from remaining in the original user.

Note that, in a case where the user terminals are associated with each other as illustrated in the database 212, when the remote operation input is restricted by one of the user terminals, it is conceivable that it is more efficient to restrict the remote operation input by all the user terminals of the associated group. Therefore, when determining to restrict the remote operation input in a certain user terminal, the control apparatus 100 may further restrict the remote operation input from the user terminal associated with the user terminal. By performing such processing, in a case where the remote operation input is restricted due to a possibility that a certain user has resold the product or the like, it is possible to collectively restrict the remote operation input also for the user terminals registered as those of a familiar user such as a family of the user. Therefore, it is possible to more efficiently manage the restriction of the remote operation.

Note that, in the present embodiment, the remote operation permitted range is set on the basis of the movement information of the vehicle 110, but for example, it is also conceivable to stop the vehicle 110 at a position where parking is performed for multiple days even in normal use, such as an airport. From such a viewpoint, the control apparatus 100 may set the remote operation permitted range so as to exclude the predetermined range based on the map information. The predetermined range based on the map information is, for example, a region such as a facility where the user is assumed to keep the vehicle stopped on the map for a long period of time, such as an airport or a port, and can be arbitrarily set by the designer of the application.

In addition, even in a case where parking is performed outside the remote operation permitted range, it is also conceivable that the vehicle is only temporarily stopped and not resold. From such a viewpoint, the control apparatus 100 may obtain the position of the user terminal present inside the vehicle 110 after getting off the vehicle, and may not restrict the remote operation input by the user terminal in a case where the position continues to be within the predetermined range from the vehicle 110.

Further, in a case where the user has a key capable of unlocking the vehicle 110 without using the user terminal 120, the user having the user terminal 120 is considered to be an authorized user of the vehicle 110. Therefore, the control apparatus 100 may decide whether or not the user terminal 120 and the above-described key can communicate with each other (for example, by near field communication), and may determine that the remote operation input is not restricted in a case where the communication is possible.

Furthermore, in the present embodiment, it is determined whether or not to restrict the remote operation input by setting the position at the time of stopping the vehicle last time as the stop position, but there may be a case where the position information of the vehicle at that time cannot be obtained due to a communication problem or the like. In such a case, the control apparatus 100 may use the position information of the user terminal present in the vehicle before at the time when the vehicle 110 is stopped, instead of the stop position of the vehicle 110.

Summary of Embodiments

The above embodiment discloses at least the following control apparatus, control method, and program.

1. A control apparatus (100) according to the above embodiment, comprises:
   a first obtaining unit configured to obtain position information of a vehicle;
   a first setting unit (203) configured to set a remote operation permitted range of the vehicle on a basis of movement information of the vehicle in a first predetermined period based on the position information; and
   a determination unit (201) configured to determine whether or not to restrict a remote operation input to the vehicle from an associated user terminal that is a user terminal associated with the vehicle on a basis of a stop position of the vehicle based on the position information and the remote operation permitted range, wherein
   the movement information includes the position information of the vehicle and a visit situation to the position in the first predetermined period.

According to this embodiment, it is possible to appropriately restrict the authority to remotely operate the vehicle.

2. In the control apparatus according to the above embodiment, the first setting unit sets the remote operation permitted range to a predetermined range centered on a position where the vehicle is continuously stopped for a second predetermined period during the first predetermined period.

According to this embodiment, it is possible to restrict the remote operation input when the stop position of the vehicle continues to deviate from the normally assumed range.

3. In the control apparatus according to the above embodiment, the second predetermined period is a predetermined number of days, and the predetermined number of days is calculated by a number of times of crossing a day.

According to this embodiment, it is possible to evaluate the stop period of the vehicle according to the number of times of crossing the day.

4. In the control apparatus according to the above embodiment, the first setting unit sets the remote operation permitted range to a predetermined range centered on a position where a number of stops in the first predetermined period is equal to or more than a predetermined number of times.

According to this embodiment, it is possible to evaluate the stop period of the vehicle according to the number of stops of the vehicle.

5. In the control apparatus according to the above embodiment, the first setting unit sets the remote operation permitted range to a predetermined range set on a basis of a region where a number of times of passage in the first predetermined period is equal to or more than a predetermined number of times.

According to this embodiment, it is possible to set a region frequently used by the user as the remote operation permitted range.

6. In the control apparatus according to the above embodiment, the first setting unit sets the remote operation permitted range to a predetermined range set on a basis of a region in which a number of times a specific operation for performing a remote operation input to the vehicle from the user terminal is performed by the user terminal is equal to or more than a predetermined number of times in a first predetermined period.

According to this embodiment, it is possible to set, as the remote operation permitted range, a region where an operation of activating a remote operation input by the user is performed at a high frequency.

7. In the control apparatus according to the above embodiment, the first setting unit sets the remote operation permitted range in such a manner as to exclude a predetermined range based on map information.

According to this embodiment, it is possible to avoid unnecessarily restricting the remote operation input when the vehicle stops in a predetermined range where long-term parking is assumed even in normal use, such as an airport.

8. In the control apparatus according to the above embodiment, the determination unit determines to restrict the remote operation input in a case where a stop position of the vehicle is present outside the remote operation permitted range during a third predetermined period.

According to this embodiment, in a case where the vehicle is present outside the remote operation permitted range for a predetermined period of time, the remote operation can be restricted.

9. In the control apparatus according to the above embodiment, the stop position is a position where the vehicle has stopped activation last time.

According to this embodiment, it is possible to avoid unnecessarily restricting the remote operation input when the vehicle is brought for repair of a failure or the like after the vehicle stops.

10. In the control apparatus according to the above embodiment, controlling unit restricts the remote operation input by invalidating a remote operation input from the associated user terminal or stopping an input of a remote operation in the associated user terminal when the determination unit determines to restrict the remote operation input.

According to this embodiment, the remote operation input can be restricted by rejecting the input content of the remote operation in the user terminal or rejecting the input itself of the remote operation to the user terminal.

11. In the control apparatus according to the above embodiment, an update unit updates the remote operation permitted range set by the first setting unit in a case where a predetermined condition is satisfied, wherein
   the controlling unit further restricts the remote operation input until a specific operation is performed by the associated user terminal when the update unit updates the remote operation permitted range.

According to this embodiment, when the remote operation permitted range is updated, it is possible to appropriately respond to a change of the user or the like.

12. In the control apparatus according to the above embodiment, the update unit updates the remote operation permitted range when a position where the vehicle is stopped for a period equal to or more than a stop period at a stop position of the vehicle used for setting the remote operation permitted range in an immediately previous update is newly detected in the first predetermined period.

According to this embodiment, it is possible to update the remote operation permitted range using the region having a use frequency equal to or higher than that at the time of previous update.

13. In the control apparatus according to claim 1,
  a notifying unit causes a notification unit inside the vehicle to give a notification of identification information in a case where the vehicle is in an unlocked state; and
  a registering unit registers the user terminal as the associated user terminal in a case where an input of the identification information in the user terminal is confirmed.

According to this embodiment, it is possible to register a user terminal associated with a vehicle for a user who can unlock without using the remote operation when performing initial setting or the like.

14. In the control apparatus according to the above embodiment,
  a second obtaining unit obtains information indicating an associated user terminal present inside the vehicle before at a time when the vehicle is stopped, wherein
  the first setting unit sets the remote operation permitted range for an associated vehicle for each of associated user terminals, and
  the determination unit determines whether or not to restrict the remote operation input from the associated user terminal on a basis of the stop position and the remote operation permitted range set for the associated user terminal obtained by the second obtaining unit.

According to this embodiment, it is possible to determine whether or not to restrict the remote operation input using the remote operation permitted range set for the user who has used the vehicle last time before the vehicle stops.

15. In the control apparatus according to the above embodiment,
  a third obtaining unit obtains information indicating a position after getting off the vehicle of an associated user terminal present inside the vehicle before, wherein
  the determination unit determines not to restrict the remote operation input from the associated user terminal present inside the vehicle before when the position after getting off the vehicle of the associated user terminal present inside the vehicle before continues to be within a predetermined range from the vehicle.

According to this embodiment, it is possible to avoid restriction of unnecessary remote operation input in a case where the user gets off the vehicle to work temporarily in the vicinity of the vehicle.

16. In the control apparatus according to the above embodiment,
  a second setting unit sets a second user terminal associated with the associated user terminal, wherein
  the determination unit further restricts the remote operation input from the second user terminal to the vehicle when it is determined to restrict the remote operation input from the associated user terminal.

According to this embodiment, it is possible to collectively manage the restrictions on the remote operation input for the users included in the group.

17. In the control apparatus according to the above embodiment,
  a deciding unit decides whether or not the associated user terminal and a key capable of unlocking of the vehicle are communicable with each other, wherein
  the determination unit determines not to restrict the remote operation input when the deciding unit decides that the associated user terminal and the key capable of unlocking the vehicle are communicable with each other.

According to this embodiment, in a case where it is decided that the user terminal is a terminal possessed by an authorized user of the vehicle, it is possible to determine that the remote operation input is not restricted.

18. In the control apparatus according to the above embodiment, wherein when it is not possible to obtain the position information of the vehicle from the vehicle, the first obtaining unit obtains, as the position information of the vehicle, position information of an associated user terminal present in the vehicle before at a time when the vehicle is stopped.

According to this embodiment, when the position of the vehicle at the time of stopping cannot be obtained, it is possible to substitute the position information of the user who has got off the vehicle.

19. A control method according to the above embodiment, comprises:
  obtaining position information of a vehicle;
  setting a remote operation permitted range of the vehicle on a basis of movement information of the vehicle in a first predetermined period based on the position information; and
  determining whether or not to restrict a remote operation input to the vehicle from an associated user terminal that is a user terminal associated with the vehicle on a basis of a stop position of the vehicle based on the position information and the remote operation permitted range, wherein
  the movement information includes the position information of the vehicle and a visit situation to the position in the first predetermined period.

According to this embodiment, it is possible to appropriately restrict the authority to remotely operate the vehicle.

20. A non-transitory computer-readable storage medium according to the above embodiment, causes the computer to:
  obtain position information of a vehicle;
  set a remote operation permitted range of the vehicle on a basis of movement information of the vehicle in a first predetermined period based on the position information; and
  determine whether or not to restrict a remote operation input to the vehicle from an associated user terminal that is a user terminal associated with the vehicle on a basis of a stop position of the vehicle based on the position information and the remote operation permitted range, wherein
  the movement information includes the position information of the vehicle and a visit situation to the position in the first predetermined period.

According to this embodiment, it is possible to appropriately restrict the authority to remotely operate the vehicle.

While an embodiment has been described, the invention is not limited to the foregoing embodiments, and various variations/changes are possible within the spirit of the invention.

What is claimed is:

1. A control apparatus comprising:
a first obtaining unit configured to obtain position information of a vehicle;
a first setting unit configured to set a remote operation permitted range of the vehicle on a basis of movement information of the vehicle in a first predetermined period based on the position information; and
a determination unit configured to determine whether or not to restrict a remote operation input to the vehicle from an associated user terminal that is a user terminal associated with the vehicle on a basis of a stop position of the vehicle based on the position information and the remote operation permitted range, wherein
the movement information includes the position information of the vehicle and a visit situation to the position in the first predetermined period.

2. The control apparatus according to claim 1, wherein the first setting unit sets the remote operation permitted range to a predetermined range centered on a position where the vehicle is continuously stopped for a second predetermined period during the first predetermined period.

3. The control apparatus according to claim 2, wherein the second predetermined period is a predetermined number of days, and the predetermined number of days is calculated by a number of times of crossing a day.

4. The control apparatus according to claim 1, wherein the first setting unit sets the remote operation permitted range to a predetermined range centered on a position where a number of stops in the first predetermined period is equal to or more than a predetermined number of times.

5. The control apparatus according to claim 1, wherein the first setting unit sets the remote operation permitted range to a predetermined range set on a basis of a region where a number of times of passage in the first predetermined period is equal to or more than a predetermined number of times.

6. The control apparatus according to claim 1, wherein the first setting unit sets the remote operation permitted range to a predetermined range set on a basis of a region in which a number of times a specific operation for performing a remote operation input to the vehicle from the user terminal is performed by the user terminal is equal to or more than a predetermined number of times in a first predetermined period.

7. The control apparatus according to claim 1, wherein the first setting unit sets the remote operation permitted range in such a manner as to exclude a predetermined range based on map information.

8. The control apparatus according to claim 1, wherein the determination unit determines to restrict the remote operation input in a case where a stop position of the vehicle is present outside the remote operation permitted range during a third predetermined period.

9. The control apparatus according to claim 8, wherein the stop position is a position where the vehicle has stopped activation last time.

10. The control apparatus according to claim 1, further comprising a controlling unit configured to restrict the remote operation input by invalidating a remote operation input from the associated user terminal or stopping an input of a remote operation in the associated user terminal when the determination unit determines to restrict the remote operation input.

11. The control apparatus according to claim 10, further comprising
an update unit configured to update the remote operation permitted range set by the first setting unit in a case where a predetermined condition is satisfied, wherein
the controlling unit further restricts the remote operation input until a specific operation is performed by the associated user terminal when the update unit updates the remote operation permitted range.

12. The control apparatus according to claim 11, wherein the update unit updates the remote operation permitted range when a position where the vehicle is stopped for a period equal to or more than a stop period at a stop position of the vehicle used for setting the remote operation permitted range in an immediately previous update is newly detected in the first predetermined period.

13. The control apparatus according to claim 1, further comprising:
a notifying unit configured to cause a notification unit inside the vehicle to give a notification of identification information in a case where the vehicle is in an unlocked state; and
a registering unit configured to register the user terminal as the associated user terminal in a case where an input of the identification information in the user terminal is confirmed.

14. The control apparatus according to claim 1, further comprising:
a second obtaining unit configured to obtain information indicating an associated user terminal present inside the vehicle before at a time when the vehicle is stopped, wherein
the first setting unit sets the remote operation permitted range for an associated vehicle for each of associated user terminals, and
the determination unit determines whether or not to restrict the remote operation input from the associated user terminal on a basis of the stop position and the remote operation permitted range set for the associated user terminal obtained by the second obtaining unit.

15. The control apparatus according to claim 1, further comprising
a third obtaining unit configured to obtain information indicating a position after getting off the vehicle of an associated user terminal present inside the vehicle before, wherein
the determination unit determines not to restrict the remote operation input from the associated user terminal present inside the vehicle before when the position after getting off the vehicle of the associated user terminal present inside the vehicle before continues to be within a predetermined range from the vehicle.

16. The control apparatus according to claim 1, further comprising
a second setting unit configured to set a second user terminal associated with the associated user terminal, wherein
the determination unit further restricts the remote operation input from the second user terminal to the vehicle when it is determined to restrict the remote operation input from the associated user terminal.

17. The control apparatus according to claim 1, further comprising
a deciding unit configured to decide whether or not the associated user terminal and a key capable of unlocking of the vehicle are communicable with each other, wherein the determination unit determines not to restrict the remote operation input when the deciding unit decides that the associated user terminal and the key capable of unlocking the vehicle are communicable with each other.

18. The control apparatus according to claim 1, wherein when it is not possible to obtain the position information of the vehicle from the vehicle, the first obtaining unit obtains, as the position information of the vehicle, position information of an associated user terminal present in the vehicle before at a time when the vehicle is stopped.

19. A control method comprising:
obtaining position information of a vehicle;
setting a remote operation permitted range of the vehicle on a basis of movement information of the vehicle in a first predetermined period based on the position information; and
determining whether or not to restrict a remote operation input to the vehicle from an associated user terminal that is a user terminal associated with the vehicle on a basis of a stop position of the vehicle based on the position information and the remote operation permitted range, wherein
the movement information includes the position information of the vehicle and a visit situation to the position in the first predetermined period.

20. A non-transitory computer-readable storage medium storing a program which, when executed by a computer comprising a processor and a memory, causes the computer to:
obtain position information of a vehicle;
set a remote operation permitted range of the vehicle on a basis of movement information of the vehicle in a first predetermined period based on the position information; and
determine whether or not to restrict a remote operation input to the vehicle from an associated user terminal that is a user terminal associated with the vehicle on a basis of a stop position of the vehicle based on the position information and the remote operation permitted range, wherein
the movement information includes the position information of the vehicle and a visit situation to the position in the first predetermined period.

* * * * *